United States Patent [19]
Haase

[11] Patent Number: 5,494,355
[45] Date of Patent: Feb. 27, 1996

[54] DEVICE FOR REMOVAL OF LUBRICANT FROM A BEARING ASSEMBLY

[75] Inventor: Detlef Haase, Mülheim A. D. Ruhr, Germany

[73] Assignee: Siemens Aktiengesellschaft, Munich, Germany

[21] Appl. No.: 369,189

[22] Filed: Jan. 5, 1995

[30]  Foreign Application Priority Data

Jul. 7, 1992  [EP]  European Pat. Off. ............... 92111498

[51] Int. Cl.⁶ ............................. F16C 33/74; F16C 33/10
[52] U.S. Cl. ......................... 384/144; 384/135; 384/403
[58] Field of Search ..................... 384/130, 135, 384/136, 144, 397, 400, 403, 465, 473

[56]  References Cited

U.S. PATENT DOCUMENTS

| | | | |
|---|---|---|---|
| 1,754,904 | 4/1930 | Ray | 384/286 |
| 2,409,874 | 10/1946 | Lessmann | 384/163 |
| 2,650,671 | 9/1953 | Brickett | 184/109 X |
| 3,071,296 | 1/1963 | Frey et al. | 384/135 X |
| 4,091,905 | 5/1978 | Sieren et al. | 192/113 B |
| 4,741,630 | 5/1988 | Oeynhausen et al. | 384/144 |
| 4,952,077 | 8/1990 | Kurt | 384/473 X |
| 5,238,166 | 8/1993 | Schwarstein et al. | 384/144 X |

FOREIGN PATENT DOCUMENTS

| | | |
|---|---|---|
| 0306634 | 3/1989 | European Pat. Off. . |
| 0222991 | 5/1989 | European Pat. Off. . |
| 378896 | 8/1923 | Germany . |
| 1238723 | 4/1967 | Germany . |
| 2091356 | 7/1982 | United Kingdom . |

*Primary Examiner*—Thomas R. Hannon
*Attorney, Agent, or Firm*—Herbert L. Lerner; Laurence A. Greenberg

[57]  ABSTRACT

A bearing assembly includes a shaft rotating about an axis and a bearing being acted upon by a liquid lubricant and supporting the shaft. A device for removing the lubricant from the bearing assembly includes at least one sealing assembly adjacent the bearing. The sealing assembly has a seal surrounding the shaft and a collector chamber disposed between the seal and the bearing. The collector chamber surrounds the shaft and receives the lubricant from the bearing along the shaft. The lubricant is removed from the collector chamber through a drain conduit. According to one embodiment, a funnel protrudes into the collector chamber for collecting the lubricant and removing the lubricant to the drain conduit. According to another embodiment, the collector chamber has a wall being approximately rectilinear relative to the axis and has a cross section perpendicular to the axis being formed by at least one spiral section encompassing the axis and one intermediate section closing the wall, and the drain conduit discharges into the wall in the region of the intermediate section.

25 Claims, 3 Drawing Sheets

DEVICE FOR REMOVAL OF LUBRICANT FROM A BEARING ASSEMBLY

CROSS-REFERENCE TO RELATED APPLICATION

This application is a Continuation of International Application Serial No. PCT/EP93/01622, filed Jun. 24, 1993.

BACKGROUND OF THE INVENTION

Field of the Invention

The invention relates to a device for the removal of a liquid lubricant from a bearing assembly for a shaft rotating about an axis, the bearing assembly having a bearing supporting the shaft, being acted upon by the lubricant and having at least one sealing assembly adjacent the bearing, the sealing assembly having a seal surrounding the shaft and a collector chamber located between the seal and the bearing and surrounding the shaft, the lubricant entering the collecting chamber from the bearing along the shaft and being removed from the collector chamber through a drain conduit.

The invention relates in particular to a slide bearing assembly in a turbine system, particularly in a steam turbine system. Particular attention is paid to slide bearing assemblies that must be protected as completely as possible against the escape of lubricant. Slide bearing assemblies that are usable in turbine systems, along with methods and devices for removing liquid lubricants and in particular lubricating oil from such slide bearing assemblies, are disclosed in European Patent No. 0 222 991 B1 and Published European Application No. 0 306 634 A2, both corresponding to U.S. Pat. No. 4,741,630. Slide bearings for turbine machines, particularly steam turbines, are described at length in those references. The inclusion of such slide bearing assemblies in journal bearings, thrust bearings and combined journal/thrust bearings is likewise presented.

One essential component of a device of that generic type is a sealing assembly for removing lubricant that escapes from the actual bearing and is intended to be retained in a suitable lubricant circuit. That objective is the product of simple economic considerations as well as thoughts on how to avoid contaminants in the vicinity of the bearing assembly. However, particularly in a steam turbine system, there is an additional essential aspect, namely to prevent the incursion of lubricant into the steam circuit, which impairs the thermodynamic process taking place in it and which moreover can cause contamination and corrosion. Especially a bearing assembly that must be mounted in an area acted upon by steam must be protected in a practical way against the escape of lubricant. That is especially true under the severe operating strains to which bearings and turbine systems and the like are exposed: In power plants, the turbine rotors rotate at speeds of several thousand revolutions per minute (typically, 3000 rpm in Europe and 3600 rpm in America), making for substantial relative speeds between the surfaces of the shafts and bearings that slide on one another in bearing assemblies. That entails very stringent requirements for the impingement of lubricant on the bearing, which in turn means considerable leakage of lubricant from the bearings. The slide bearing assemblies presented in European Patent No. 0 222 991 B1 and Published European Application No. 0 306 634 A2, both corresponding to U.S. Pat. No. 4,741, 630, are especially constructed to overcome those problems. Above all, a speedy removal of the quantities of lubricant that escape from the slide bearings is intended to be assured, and moreover a removal of oil from the seals associated with the slide bearings should also be attained to a certain extent.

In every bearing assembly known until now, the removal of lubricant from the collecting ring disposed next to the bearing is accomplished essentially only by means of a natural gradient, which is achieved by suitably laying the drain conduits for the lubricant.

SUMMARY OF THE INVENTION

It is accordingly an object of the invention to provide a device for removal of lubricant from a bearing assembly, which overcomes the hereinafore-mentioned disadvantages of the heretofore-known devices of this general type, which is improved overall and in which the equipment expense and the attendant commercial expenditure remains as slight as possible.

With the foregoing and other objects in view there is provided, in accordance with the invention, a device for removing a liquid lubricant from a bearing assembly having a shaft rotating about an axis and a bearing being acted upon by the lubricant and supporting the shaft, comprising at least one sealing assembly adjacent the bearing, the at least one sealing assembly having a seal surrounding the shaft and a collector chamber disposed between the seal and the bearing, the collector chamber surrounding the shaft and receiving the lubricant from the bearing along the shaft, a drain conduit through which the lubricant is removed from the collector chamber, and a funnel protruding into the collector chamber for collecting or catching the lubricant and removing the lubricant to the drain conduit.

In accordance with another feature of the invention, the funnel is disposed in the immediate vicinity of the shaft.

With the objects of the invention in view, there is also provided a device for removing a liquid lubricant from a bearing assembly having a shaft rotating about an axis and a bearing being acted upon by the lubricant and supporting the shaft, comprising at least one sealing assembly adjacent the bearing, the at least one sealing assembly having a seal surrounding the shaft and a collector chamber disposed between the seal and the bearing, the collector chamber surrounding the shaft and receiving the lubricant from the bearing along the shaft, the collector chamber having a wall being approximately rectilinear relative to the axis and having a cross section perpendicular to the axis being formed by at least one spiral section encompassing the axis and one intermediate section closing the wall, and a drain conduit receiving the lubricant removed from the collector chamber and discharging into the wall in the region of the intermediate section.

Both of these structures for attaining the object of the invention can also be combined with one another. For that purpose, in a collector chamber having a wall formed of at least one spiral section and at least one intermediate section, a funnel that discharges into the drain conduit in the region of the intermediate section is provided as mentioned.

The invention exploits the momentum imparted to the lubricant in the collector chamber by the rotating shaft. The momentum is transmitted partly by friction and partly by the lubricant spun off at a tangent by the rotating shaft. This lubricant strikes lubricant located on the radial wall of the collector chamber and imparts its momentum to that lubricant. The overall result is accordingly a flow of lubricant around the axis in the same direction of rotation as that in which the shaft rotates. According to the invention, this rotary flow is caught in the collector chamber and removed from the collector chamber without any substantial loss in velocity, or in other words a loss in velocity aside from the unavoidable friction losses dictated by the viscosity of the lubricant. The interaction between the rotating shaft and the lubricant located in the collector chamber is utilized according to the invention in order to pump the lubricant out of the collector chamber.

In accordance with another feature of the invention, it is especially advantageous if the lubricant is drained approximately vertically downward from the collector chamber, since in this way, not only the pumping action of the rotating shaft but also the force of gravity contributes to the removal of the lubricant.

According to the invention, an essential deceleration of the lubricant sent into motion by the rotating shaft is avoided. The momentum of the lubricant is not first neutralized by an impact or the like so that a removal can then be accomplished by means of suitably powerful pumping devices or the like. Instead, the lubricant which is set into rapid motion is caught by suitable means and carried directly to a drain conduit, and the momentum of the lubricant is substantially exploited.

The funnel for collecting the lubricant and protruding into the collector chamber preferably has a mouth oriented approximately in a plane that is radial to the shaft.

It is also advantageous for the collector chamber wall, surrounding the collector chamber and being oriented approximately rectilinearly to the axis, to be constructed with a spiral cross section, so that this cross section has a spiral section essentially encompassing the axis one full time and an intermediate section that closes the curve represented by the spiral section and that is oriented approximately radially.

It should be noted that the wall could optionally be formed with a plurality of spiral sections and a plurality of intermediate sections, in particular two spiral sections each of which surrounds approximately half of the axis and two intermediate sections each of which joins the two spiral sections to one another. Devices can logically also be made with numerous spiral sections and intermediate sections. Such structures are especially recommended when relatively large quantities of lubricant have to pass through the collector chamber.

As already noted, according to the invention the lubricant removed from the collector chamber may be delivered to a jet pump and can act as a driving medium in this jet pump. In this context, in accordance with a further feature of the invention, there is provided an injection line being connected to the collector chamber for the removal of the lubricant, the injection line together with the drain conduit forming a jet pump, and the injection line acting as a driving medium line. Thus suction can be generated in the drain conduit, and this suction can be advantageously exploited either within the scope of the device according to the invention or in other ways.

In accordance with an added feature of the invention, there is provided a first section line connected to a drain conduit that as noted belongs to a jet pump, the suction line communicating with the seal in order to remove a fluid, especially lubricant, steam, water, air or mixtures thereof, by suction. In this way, the throughput of lubricant through the seal can be decreased, and substantial improvement in the sealing action is attainable. This is important above all in bearing assemblies in turbine systems that are bathed with the flow of steam or condensate and that must be protected against the escape of lubricant for thermodynamic reasons.

In accordance with an additional feature of the invention, there is provided a second suction line also connected to a jet pump formed with a drain conduit, the second suction line communicating with the collector chamber in order to remove a fluid, particularly lubricant, steam, water or air, by suction. This creates a second capability of removing lubricant from the collector chamber and this effectively precludes the danger of a backup of lubricant in the collector chamber and removes lubricant from the collector chamber that was not caught by the high speed collecting or catching means according to the invention. The function of the catching means according to the invention is thereby reinforced because these means are kept free of slow-moving lubricant.

In accordance with yet another feature of the invention, the device according to the invention is especially suitable, in the context of any embodiment, for upgrading a slide bearing assembly, preferably in a turbine system and in particular a steam turbine system.

In accordance with a concomitant feature of the invention, the device is especially suitable for use in heavy-duty turbine systems in power plants and the like and it is particularly suitable for upgrading a slide bearing assembly in an end journal bearing of a turbine system, wherein the bearing is disposed in a steam-filled steam chamber of the turbine system.

It should also be pointed out that a bearing assembly may naturally have components in addition to those already mentioned. For instance, it is conceivable for a bearing to be provided with one collector chamber and one seal on each axial end. It should also be noted that particularly in many steam turbine systems, the seals in bearing assemblies are in multiple parts and/or are structured. Thus between the interior of a turbine and the bearing, there are often a plurality of sealing sections as viewed along the shaft, between which there are chambers each being acted upon by steam, evacuated or supplied with air, depending on its structure and function. The purpose of all of this is to allow the creation of a leakage flow with certain properties in each partial seal, in particular with a defined magnitude and direction and composition, and to conduct these leakage flows out of the seal at certain points and deliver them for further treatment which is suitable for their particular composition.

Other features which are considered as characteristic for the invention are set forth in the appended claims.

Although the invention is illustrated and described herein as embodied in a device for removal of lubricant from a bearing assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
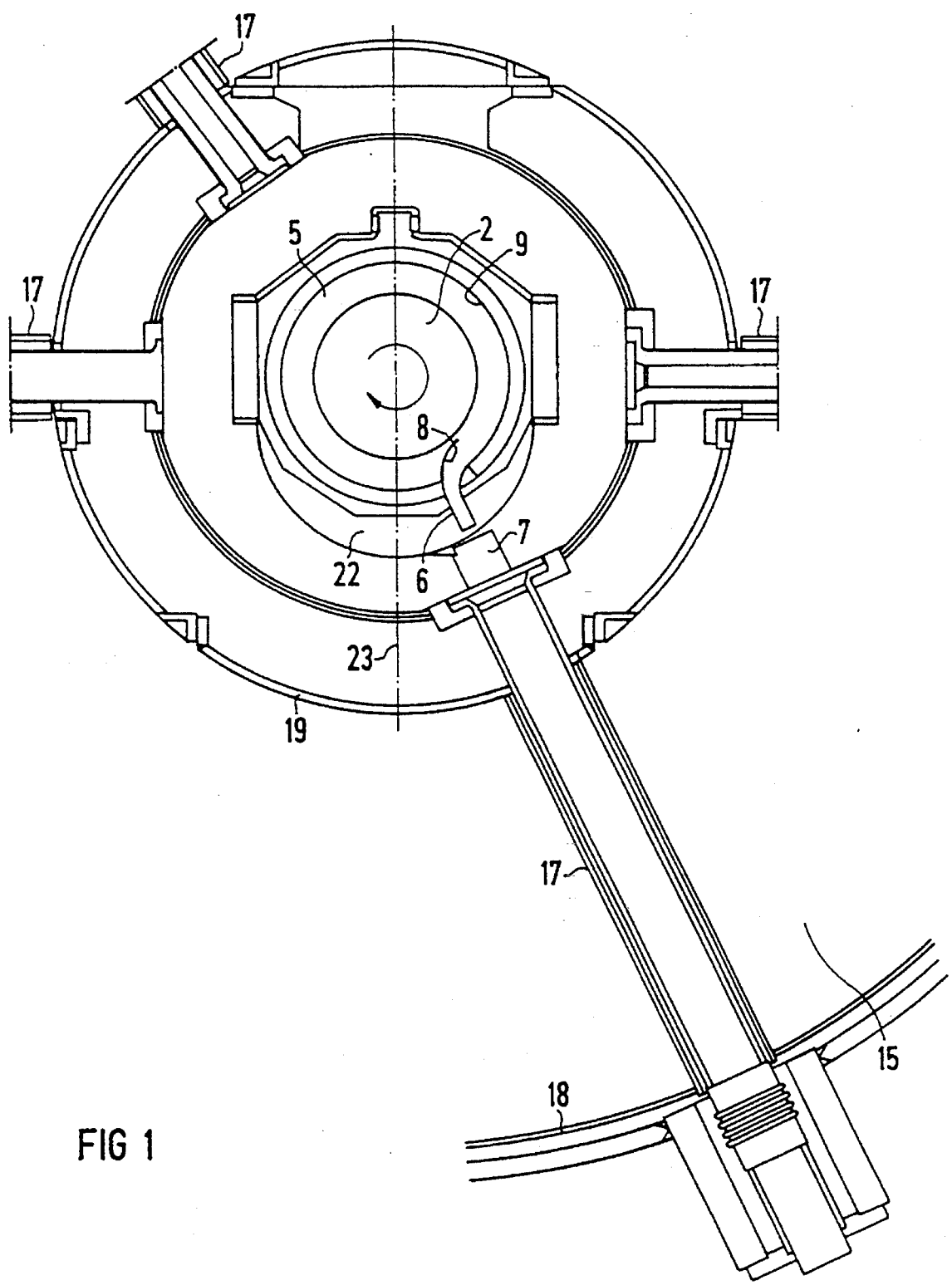
FIG. 1 is a fragmentary, diagrammatic, cross-sectional view of a device according to the invention in the region of a collector chamber.

Referring now to the figures of the drawing in detail and first, particularly, to FIG. 1 thereof, there is seen a device according to the invention in which a shaft 2 is surrounded in the vicinity of a non-illustrated bearing, in particular a slide bearing, and in the vicinity of a likewise non-illustrated seal, by a collector chamber 5 collecting lubricant that emerges from the bearing along the shaft 2. In the collector chamber 5, the lubricant flows around the rotating shaft 2 in the same direction of rotation as that in which the shaft 2 rotates. The flow of lubricant is kept moving partly by friction at the rotating shaft 2 and partly because lubricant spun from the shaft 2 at a tangent joins with the lubricant flowing over a wall 9 of the collector chamber or space 5 and imparts its momentum to it. According to the invention, the lubricant is caught in the collector chamber 5 by a funnel 8 and is conducted, without any substantial loss in velocity, through an injection line 6 into a drain conduit or outflow line 7. The drain conduit 7 is oriented approximately vertically, so that gravity can also be exploited in removing the lubricant. The vertical direction is represented by a vertical line 23. The lubricant is delivered through the drain conduit 7 to other non-illustrated conveying and collecting devices, which as a rule are part of an essentially self-contained circuit for the lubricant. Any known components may be used in the usual way to construct the lubricant circuit.

Located below the collector chamber 5 is a drain chamber 22, in which lubricant that does not reach the funnel 8 can be caught. This is significant because as a rule, with a device such as the funnel 8, it is not possible to catch all of the lubricant entering the collector chamber 5. It is generally expected that a considerable portion of the lubricant will not reach the funnel 8 and therefore must be removed by other means. By way of example, the drain chamber 22 may be provided for this purpose below the collector chamber 5. The drain chamber 22 communicates with the collector chamber 5 through non-illustrated bores or the like in the wall 9, and the lubricant can be drained from it through the drain conduit 7 or some other line which is especially provided for that purpose. The bearing shown in FIG. 1 is a bearing for a steam turbine system and is accommodated in a steam-filled steam chamber 15. The bearing is surrounded by a bearing casing 19 and is held by supports 17 in an outer casing 18 of the steam turbine system.

Figure 2:
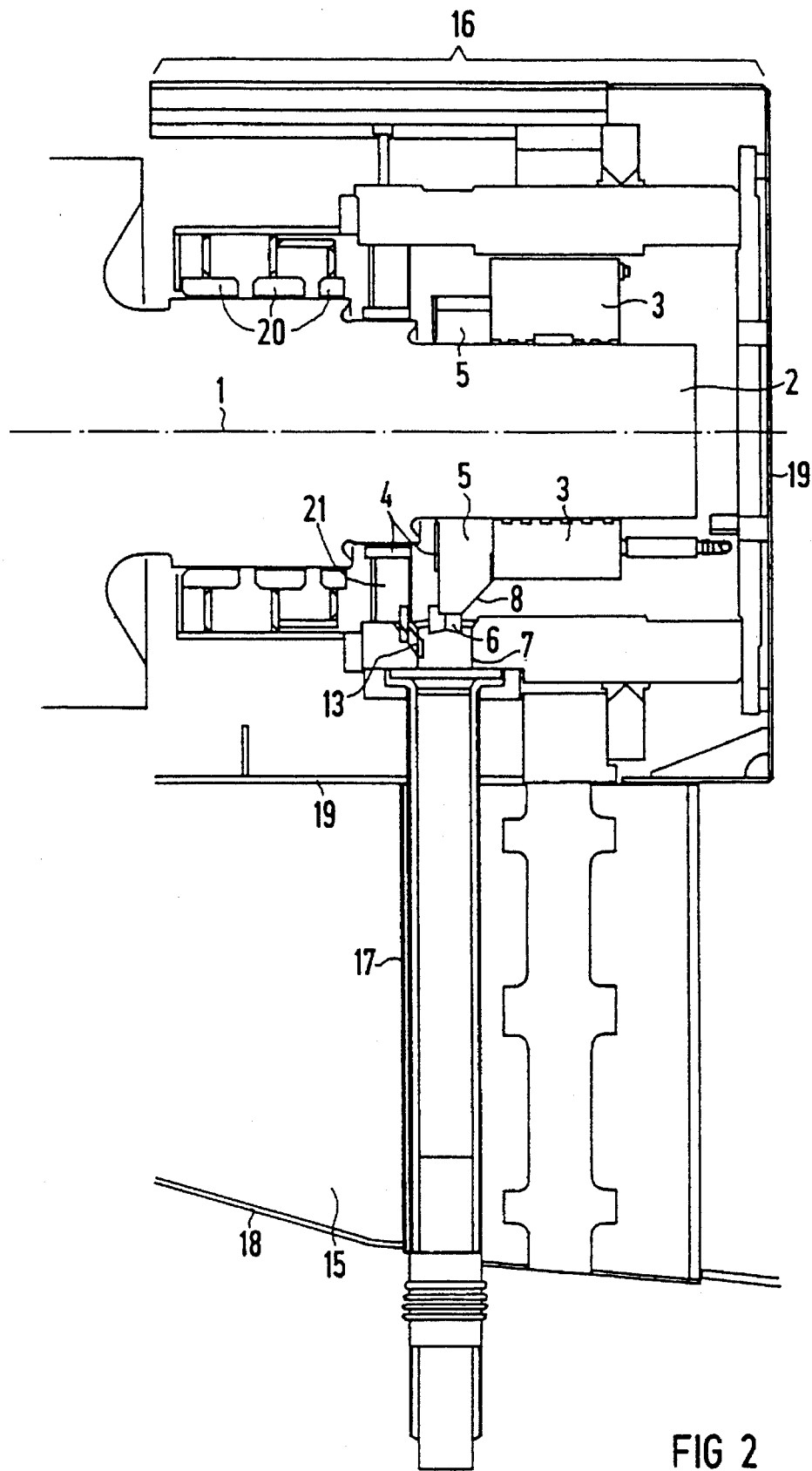
FIG. 2 is a fragmentary, longitudinal-sectional view of the device shown in FIG. 1.

Further details of the structure of a bearing assembly like that shown in cross section in FIG. 1 may be learned from FIG. 2. The shaft 2 is rotatable about an axis 1 and is supported in a slide bearing 3, to which lubricant, as a rule lubricating oil, is supplied through non-illustrated devices. Since as a rule a slide bearing 3 cannot be constructed completely tightly, as is true with any other bearing, lubricant escapes from the slide bearing 3 along the shaft 2. In order to prevent this escaping lubricant from uncontrollably soiling the bearing assembly or its vicinity and possibly impairing its function, a special seal 4 is provided, such as a labyrinth seal, which may optionally also be constructed in multiple parts, in order to catch this lubricant. Moreover, the collector chamber 5 surrounding the shaft 2 is provided between the slide bearing 3 and the seal 4. The lubricant emerging from the slide bearing 3 collects in the collector chamber 5 and the lubricant is removed from it. As is shown in FIG. 1, the lubricant in the collector chamber 5 is caught by the funnel 8 (the funnel is highly diagrammatically illustrated in FIG. 2) and is delivered to the injection nozzle or line 6 of the drain conduit 7. The injection line 6 and the drain conduit 7 together form a jet pump and generate suction. As is shown in FIG. 2, this suction is utilized on one hand to remove lubricant by suction from the vicinity of the slide bearing 3. On the other hand, the suction is utilized to remove lubricant vapors, air and any other fluids that might have entered by conducting them through a first suction line 13 from a suction chamber 21 that is part of the seal 4 and communicates with the seal 4 through non-illustrated bores or the like. Additional seals 20 are also provided on the shaft 2 besides the seal 4 which above all serves the purpose of partitioning off other regions of the partially-illustrated turbine system from lubricants. These additional seals 20 serve to keep steam from the turbine system from reaching the bearing assemblies. The further configuration of the additional seals 20 may be accomplished in accordance with the teaching of the prior art.

The bearing assembly shown in FIG. 2 forms an end journal bearing 16, which is disposed in the steam chamber 15 of the steam turbine system. The end journal bearing 16 is retained in the steam chamber 15 by the supports 17. The illustrated support 17 is hollow, and the drain conduit 7 is passed through it. In order to keep the steam away from the bearing assembly, the end journal bearing 16 is surrounded by the bearing casing 19.

Figure 3:
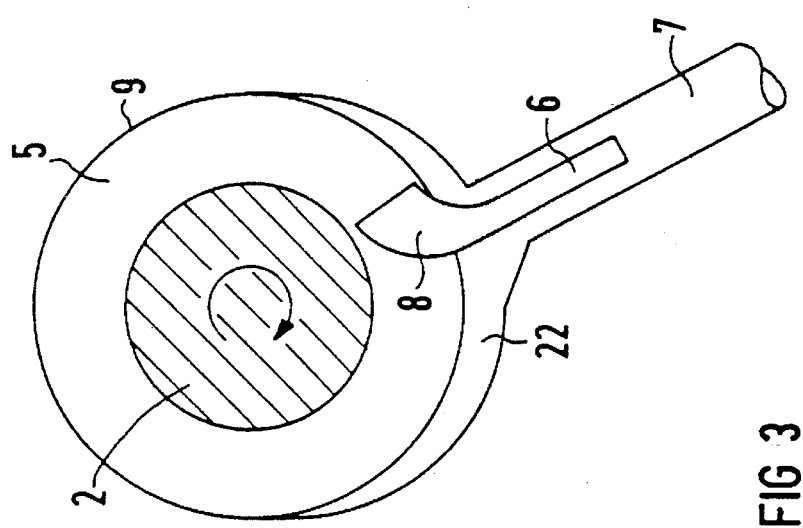

FIG. 3 diagrammatically shows a first embodiment of means for catching the lubricant in the collector chamber 5. The collector chamber 5 surrounds the rotating shaft 2 and the direction of rotation of the rotating shaft 2 is shown in the form of a curved arrow. The wall 9 of the collector chamber 5 has an essentially circular cross section. The funnel 8 is disposed in the collector chamber 5. The funnel extends as far as the immediate vicinity of the shaft 2, and it catches the lubricant spun from the shaft 2 and diverts it through the injection line 6 into the drain conduit 7. Besides the lubricant spun off directly from the shaft 2, the funnel 8 also catches at least some of the lubricant that flows along the wall 9 and is driven by the lubricant which is spun off from the shaft 2 and strikes the wall 9. In order to also remove the quantities of lubricant that are not caught by the funnel 8, the collector chamber 5 communicates with the drain chamber 22, into which the lubricant from the collector chamber 5 can enter through non-illustrated bores or slits in the wall 9. The lubricant can flow directly to the drain conduit 7 from the drain chamber 22. This flow is reinforced by the suction created in the jet pump formed of the injection line 6 and the drain conduit 7, in which the lubricant caught by the funnel 8 forms a driving medium.

Figure 4:
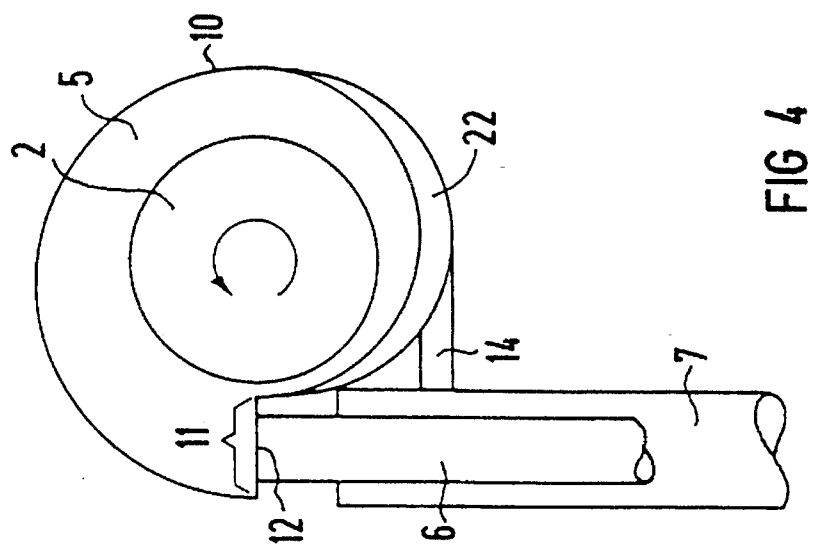
FIGS. 3 and 4 are fragmentary, cross-sectional views of devices according to the invention in the region of the collector chamber.

Another embodiment of the collector chamber is shown in FIG. 4. The wall of the collector chamber 5, which is located essentially parallel to the axis (leading out of the plane of the drawing) about which the shaft 2 rotates, includes one spiral section 10 and one intermediate section 11, which closes the spiral section 10 and is oriented essentially radially. In the region of the intermediate section 11, the wall of the collector chamber 5 has a mouth 12, to which the injection line 6 is connected. Once again the drain chamber 22 is disposed under the collector chamber 5. The drain chamber 22 can be evacuated through a second suction line 14 connected to the drain conduit 7. Once again, the drain conduit 7 and the injection line 6 form a jet pump.

According to the invention, the removal of lubricant from a bearing assembly can be performed by exploiting the momentum imparted by the rotating shaft in the bearing assembly to the lubricant that is to be removed. This assures effective lubricant removal with little complication in terms of equipment.

I claim:

1. A device for removing a liquid lubricant from a bearing assembly having a shaft rotating about an axis and a bearing being acted upon by the lubricant and supporting the shaft, comprising:

at least one sealing assembly adjacent the bearing, said at least one sealing assembly having a seal surrounding the shaft and a collector chamber disposed between said seal and the bearing, said collector chamber surrounding the shaft and receiving the lubricant from the bearing along the shaft, a drain conduit through which the lubricant is removed from said collector chamber, and a funnel protruding into said collector chamber for collecting the lubricant and removing the lubricant to said drain conduit.

2. The device according to claim 1, wherein said funnel is disposed in the immediate vicinity of the shaft.

3. The device according to claim 1, wherein said drain conduit is oriented approximately vertically.

4. The device according to claim 1, including an injection line being connected to said collector chamber for removal of the lubricant, said injection line forming a jet pump together with said drain conduit, and said injection line being a driving medium line of said jet pump.

5. The device according to claim 4, including a suction line being connected to said drain conduit and communicating with said seal for removal of a fluid by suction.

6. The device according to claim 5, including another second suction line being connected to said drain conduit and communicating with said collector chamber for the removal of a fluid by suction.

7. The device according to claim 4, including a suction line being connected to said drain conduit and communicating with said seal for removing a fluid selected from the group consisting of lubricant, steam, water and air by suction.

8. The device according to claim 7, including another second suction line being connected to said drain conduit and communicating with said collector chamber for the removal of a fluid selected from the group consisting of lubricant, steam, water and air by suction.

9. The device according to claim 1, wherein the bearing assembly is part of a turbine system.

10. The device according to claim 1, wherein the bearing assembly is part of a steam turbine system.

11. The device according to claim 10, wherein the bearing assembly is an end journal bearing disposed in a steam chamber of the turbine system.

12. The device according to claim 1, wherein the bearing is a slide bearing.

13. A device for removing a liquid lubricant from a bearing assembly having a shaft rotating about an axis and a bearing being acted upon by the lubricant and supporting the shaft, comprising:

at least one sealing assembly adjacent the bearing, said at least one sealing assembly having a seal surrounding the shaft and a collector chamber disposed between said seal and the bearing, said collector chamber surrounding the shaft and receiving the lubricant from the bearing along the shaft, said collector chamber having a wall being approximately rectilinear relative to the axis and having a cross section perpendicular to the axis being formed by at least one spiral section encompassing the axis and one intermediate section closing said wall, and a drain conduit receiving the lubricant removed from said collector chamber and discharging into said wall in the region of said intermediate section.

14. The device according to claim 13, wherein said drain conduit is oriented approximately vertically.

15. The device according to claim 13, including an injection line being connected to said collector chamber for removal of the lubricant, said injection line forming a jet pump together with said drain conduit, and said injection line being a driving medium line of said jet pump.

16. The device according to claim 15, including a suction line being connected to said drain conduit and communicating with said seal for removal of a fluid by suction.

17. The device according to claim 16, including another second suction line being connected to said drain conduit and communicating with said collector chamber for the removal of a fluid by suction.

18. The device according to claim 15, including a suction line being connected to said drain conduit and communicating with said seal for removing a fluid selected from the group consisting of lubricant, steam, water and air by suction.

19. The device according to claim 18, including another second suction line being connected to said drain conduit and communicating with said collector chamber for the removal of a fluid selected from the group consisting of lubricant, steam, water and air by suction.

20. The device according to claim 13, wherein the bearing assembly is part of a turbine system.

21. The device according-to claim 13, wherein the bearing assembly is part of a steam turbine system.

22. The device according to claim 21, wherein the bearing assembly is an end journal bearing disposed in a steam chamber of the turbine system.

23. The device according to claim 13, wherein the bearing is a slide bearing.

24. The device according to claim 13, including a funnel protruding into said collector chamber for collecting the lubricant and removing the lubricant to said drain conduit.

25. The device according to claim 24, wherein said funnel is disposed in the immediate vicinity of the shaft.

* * * * *